Aug. 8, 1939.     A. R. LEUKHARDT     2,168,748
FLUID PRESSURE BRAKING SYSTEM
Filed Dec. 9, 1936     2 Sheets-Sheet 1
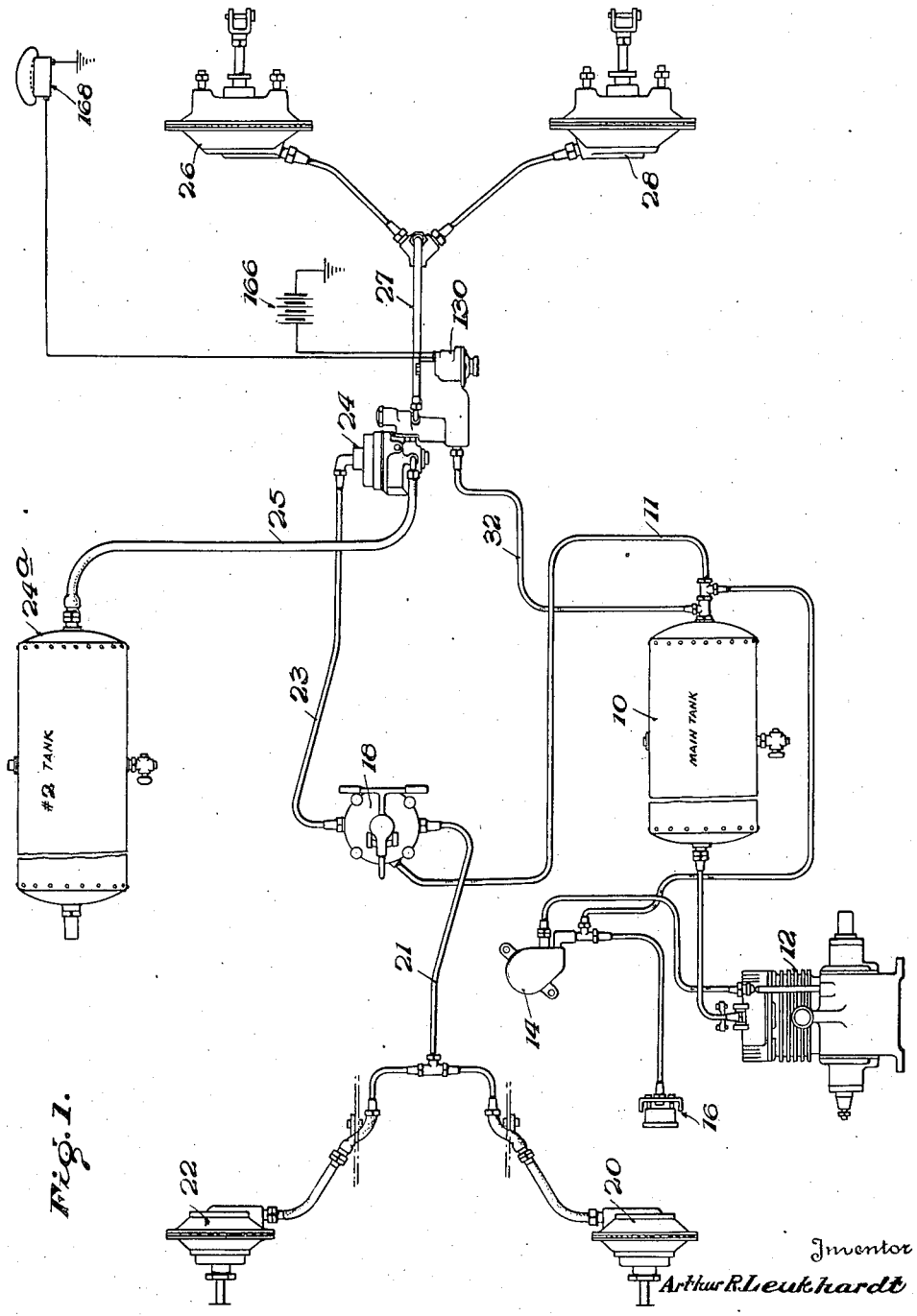

Aug. 8, 1939.     A. R. LEUKHARDT     2,168,748
FLUID PRESSURE BRAKING SYSTEM
Filed Dec. 9, 1936     2 Sheets-Sheet 2

Inventor
Arthur R. Leukhardt

Patented Aug. 8, 1939

2,168,748

UNITED STATES PATENT OFFICE 2,168,748

FLUID PRESSURE BRAKING SYSTEM

Arthur R. Leukhardt, Pittsburgh, Pa., assignor to Bendix-Westinghouse Automotive Air Brake Company, Pittsburgh, Pa., a corporation of Delaware Application December 9, 1936, Serial No. 115,013

20 Claims. (Cl. 303—63)

This invention relates in general to automotive air brake systems, and in particular to the control valves and their operation with particular relation to their safety features.

In fluid pressure braking systems, it is usual to provide a main source of fluid pressure which is normally operative to supply the braking system with air under pressure during all normal brake applications. In order to safeguard against the possible failure of the main source of supply by reason of a broken pipe line or other cause, an auxiliary or emergency storage reservoir is provided together with automatic valves which, upon failure of the main supply, connect the auxiliary or emergency supply direct to the brakes, thereby stopping the vehicle and preventing its operation while such failure of the main system exists.

It will readily be appreciated that such systems have considerable merit, but that in automotive vehicles, particularly passenger vehicles, an emergency, sudden and full application of the brakes might, under certain circumstances, cause unnecessary accidents, possibly due to skidding resulting from suddenly locked wheels on slippery pavements, or might even cause the vehicle to stop with brakes locked on a dangerous rail or road crossing.

It is accordingly an object of this invention to improve the existing emergency valve structures by providing a manual means which may, by deliberate act of the vehicle driver, cause the release of the automatic emergency brake application, thereby permitting the operator to suitably maneuver the vehicle in bringing the same to rest.

Another object is to provide, in an automotive air brake system having normal control and automatic emergency valves, a means for temporarily placing the operation of the emergency valve under the control of the operator.

A further object of the invention is to provide a convenient means accessible to the driver in a system such as heretofore described which, when deliberately actuated, will temporarily destroy the effect of an automatic emergency valve operation.

Still another object of the invention is to provide means including a simple solenoid valve and manually-operated switch in circuit therewith in a system such as heretofore described, so that the effect of an automatic emergency brake application may be temporarily offset by the operator.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a diagrammatic illustration of an air brake system employing the emergency valve and auxiliary control, and Fig. 2 is a sectional view of the valve structure illustrating the essential details.

In the piping diagram of Fig. 1, there will be seen a main storage reservoir tank 10 supplied from a compressor 12 having a pressure governor 14 and gauge 16. The left-hand end of the tank 10 is provided with a pipe connection 11 to a brake valve 18 of any preferred type. The valve in turn is provided with a pipe connection 21 to the brake chambers 20 and 22 which in the present system are adapted to actuate the front vehicle brakes but which may actuate both front and rear brakes, and also a pipe connection 23 to a relay and emergency control valve 24 which may correspond generally to a modified valve as shown and described in United States Letters Patent No. 2,049,984, issued August 4, 1936, to Vorech et al.

The relay control valve is shown in detail in Fig. 2, and will be seen to control the flow of fluid pressure from an auxiliary or emergency reservoir 24a through a pipe 25 leading to the valve and a pipe 27 leading from the valve to the brake chambers 26 and 28 which may in the present instance actuate the rear wheel brakes or brakes on a trailer, the relay being controlled by fluid pressure from the service valve 18.

For a complete and detailed description of the structure of the relay valve 24, reference is made to the hereinabove mentioned patent to Vorech et al. No. 2,049,984. For the purposes of a sufficient understanding of the present invention, it will appear that pressure from the master brake valve 18 enters chamber 96 causing the flexible diaphragm 94 to seat upon the annular valve rim 97 and force the valve stem 124 and guiding spider 122 downwardly, thereby unseating valve 100 and permitting the flow of compressed air from the auxiliary tank 24a through pipe 25 into chamber 102 past valve 100 into the chamber 104, thence past valve 110 and to the rear brake chambers 26 and 28 through port 121 and pipe 27. When the pressure in the passages and brake chambers 26 and 28 just described equals the pressure from the brake valve 18 which causes the diaphragm 94 to unseat valve 100, the diaphragm 94 will be raised by the spring 111, the pressures on the opposite sides of the diaphragm being equal and the valve 100 closed. Reduction of pressure from the master valve will permit the pressure in the brake chambers 26 and 28 to unseat the diaphragm 94 from the valve rim 97, thereby exhausting the brake chambers.

The valve 110 is ordinarily maintained in open position by pressure originating from the main reservoir 10 being supplied to the valve by a pipe line 32 through a double check valve 40, and thence to the under surface of diaphragm 108 to which the stem of valve 110 is secured. Pressure on the underside of the diaphragm 108 not only maintains the valve 110 open but holds the diaphragm in tight sealed contact with the annular lip 109, the outer edge of the diaphragm 108 being moved upwardly in such a manner that fluid pressure flows from the main reservoir 10 past the edge of diaphragm 108 through chamber 116 to pipe 25 and thence to the auxiliary supply tank in order to maintain the latter in charged condition from the pump 12.

From the foregoing, it will appear that, upon breakage of the pipe line 32 or loss of pressure in the main reservoir 10, the pressure of the underside of diaphragm 108 would become less than that on the top side, the pressure on the top side being the combined pressure derived from chamber 116 directly connected to the auxiliary supply tank and that from chamber 121 in connection with the auxiliary tank through valves 110 and 100, the latter, however, being closed generally when emergencies arise due to failure of pressure in line 23. However, pressure on the outer annular portion of the diaphragm 108 is sufficient to unseat the diaphragm from the annular rim 109 and close valve 110, thereby connecting auxiliary reservoir 24 direct to the brake chambers 26 and 28 and applying the brakes.

In order that this emergency application may be prevented by deliberate act of the driver to prevent the possibility of sudden hazardous stops, the double check valve 40 heretofore referred to is provided in combination with an electric solenoid-operated valve 130, the two constituting a by-pass around the diaphragm 108 when the solenoid is energized to open the valve and the pressure in the main reservoir 10 is depleted.

Referring to Fig. 2, the double check valve will be seen to comprise a cylinder valve chamber 132 with ports in either end and a slidable piston valve 134, the end faces 136 and 138 of which are adapted to make fluid-tight engagement with either end wall 140 or 142 of the cylinder chamber, thereby blocking off the pipe line 32 or the passage 144 which extends to the solenoid valve and thence through passage 146 to the upper side of the diaphragm 108.

While any form of valve and valve actuator may be employed for the purpose of controlling the by-pass passages 144 and 146 around the diaphragm 108, a solenoid-operated valve is illustrated comprising a spring-pressed valve 148 and valve seat 150, the valve having a stem 152 extending downwardly to a point adjacent the upper end of a solenoid-operated armature 154. Lost motion between the stem with the valve seated and the armature 154 when not excited is provided so that the valve 148 may have no interference in its seating function.

In order to normally vent the passage 144 when the valve 148 is closed, the valve guide sleeve 156, in which the valve stem 152 slides, is open at its lower end and adapted to vent through a port 158 to exhaust, and, in order that the exhaust port may be closed off when the valve 148 is opened, the upper end of the solenoid armature is ground to form a valve 160 which, when raised, engages a seat 162 formed in the lower end of the sleeve 156.

For the purpose of actuating the solenoid armature, the winding 164 on the solenoid is connected to a battery 166 and a control button 168, the latter being preferably placed in a convenient and accessible position with relation to the driver's controls.

The operation of the valve structure of Figs. 1 and 2 has already been made clear with the exception of the influence of the by-pass valve 148 and the double check valve 40. It will be understood that, upon failure of pressure in pipe line 32 or the main reservoir connected to it, the valve 110 is closed by reason of the loss of pressure on the underside of diaphragm 108 and the preponderance of pressure on the annular portion of the upper side, thus lowering the diaphragm away from lip 109 and permitting flow from reservoir 24 through pipe 25, chambers 102 and 116, past lip 109 and into port 121 to apply the rear brakes.

If, for some reason, such emergency application is undesirable, the operator may energize the solenoid 130, opening valve 148 and closing off exhaust port 162, thus exposing the right-hand face 138 of the double check piston valve to the pressure of the auxiliary reservoir 24a, it being understood that, due to some failure, the left-hand face may possibly be under atmospheric pressure. This pressure causes the piston valve 134 to slide to the left, thereby connecting the underside of diaphragm 108 through the by-pass to the upper side and thence to the auxiliary reservoir 24a. With equal pressures on opposite sides of the diaphragm, the spring 111 seats the diaphragm against the lip 109, opening valve 110, exhausting the rear brake chamber through chamber 104, around valve lip 97, the diaphragm 94 lifting for this purpose.

Upon opening the solenoid circuit and closing the valve 148 and exhausting passage 144 through port 158, the diaphragm 108 is again forced down by pressure on the top annular portion, closing valve 110, thereby connecting reservoir 24a to the brake chambers 26 and 28. Any number of releases and applications may be made as long as the pressure in the reservoir 24a reserve lasts, and, if the main supply from reservoir 10 is re-established, the double check piston valve 134 is promptly driven to the right and the system becomes fully operative in its normal manner.

There is thus provided a relatively simple control over the severe emergency application of the control valve, so that hazardous emergency stops may be avoided in the discretion of the driver.

Though only one embodiment and modification of the invention has been illustrated and described, it is to be understood that the invention is not limited thereto but may be embodied in various mechanical forms. Since many changes in the construction and arrangement of the parts may be made without departing from the spirit of the invention, as will be apparent to those skilled in the art, reference will therefore be had to the appended claims for a definition of the limits of the invention.

What is claimed is:

1. In an automotive braking system, in combination, service brake-applying means, automatic emergency brake-applying means for effecting a brake application on failure of said first named means, and means under the control of the operator for temporarily releasing an emergency brake application.

2. In an automotive braking system, in combination, service brake-applying means, automatic emergency brake-applying means for effecting a brake application on failure of said first named means, and means under the control of the operator for preventing the operation of said automatic means.

3. In an automotive braking system, in combination, service brake-applying means, automatic emergency brake-applying means for effecting a brake application on failure of said first named means, and means under the control of the operator for manually rendering said automatic means ineffective or effective at will.

4. In a fluid pressure braking system, in combination, service brake-applying means, automatic fluid pressure emergency brake-applying means for effecting a brake application on failure of said first named means, and means under the control of the operator for rendering said automatic means ineffective or effective at will.

5. A fluid pressure braking system comprising a main fluid pressure reservoir, an auxiliary fluid pressure reservoir, a brake valve for applying wheel brakes from said main reservoir, and for controlling the application of other wheel brakes from said auxiliary reservoir, means for automatically applying said last named wheel brakes from said auxiliary reservoir on failure of said main reservoir, and means under the control of the operator for temporarily rendering said last named means inoperative.

6. In an emergency and emergency-release valve assembly, a brake chamber, means for supplying said brake chamber from a fluid pressure reservoir through either of two valves, a second reservoir, means responsive to the pressure in said second reservoir for selecting one or the other of said two valves, means whereby fluid may flow from the second reservoir to the first upon a preponderance of pressure in the second, and means for cutting off said second reservoir from said selecting means.

7. In a fluid pressure brake system, a brake chamber, means for supplying said brake chamber from a source of fluid pressure through either of two passages, a second source of fluid pressure, means responsive to the pressure of said second source for determining which passage shall supply fluid pressure to the brake chamber, and means for disconnecting said second source from said last named means.

8. In a fluid pressure brake system, a brake chamber, means for supplying said brake chamber from a source of fluid pressure through either of two passages, a second source of fluid pressure, means whereby fluid may flow from said second source to said first source upon a preponderance of pressure in said second source, differential means having opposed surfaces exposed to the pressure of said sources and responsive to differences between the pressures of said sources for determining which passage shall supply fluid pressure to the brake chamber, means for disconnecting said second source from said last named means, and means for exposing both of said opposed surfaces to said first named source of pressure.

9. In a fluid pressure brake system, a brake chamber, means for supplying said brake chamber from a source of fluid pressure through either of two passages, a second source of fluid pressure, differential means having opposed surfaces exposed to the pressures of said sources and responsive to differences between the pressures of said sources for determining which passage shall supply fluid pressure to the brake chamber, means for disconnecting said second source from said last named means, and means for exposing both of said opposed surfaces to said first named source of pressure.

10. In a fluid pressure brake system, a brake chamber, means for supplying said brake chamber from a source of fluid pressure through either of two passages, a second source of fluid pressure, differential means having opposed surfaces exposed to the pressures of said sources and responsive to differences between the pressures of said sources for determining which passage shall supply fluid pressure to the brake chamber, and means for exposing both surfaces of said differential means to the first named source of fluid pressure to the exclusion of said last named source of pressure, or for exposing one of said surfaces to said first named source and the other to atmosphere.

11. In a fluid pressure brake system, a brake chamber, means for supplying said brake chamber from a source of fluid pressure through either a service passage or an emergency passage, differential means having opposed surfaces, one exposed to said source of fluid pressure and the other exposed to a second source of fluid pressure, for determining which of said passages shall supply fluid pressure to said brake chamber, a normally closed by-pass connecting said opposed surfaces, and means for cutting off said second source of fluid pressure and opening said by-pass.

12. In a fluid pressure brake system, a chamber having a floating diaphragm, a portion of the upper surface being continuously exposed to a source of fluid pressure and another portion being adapted to close off direct communication between said source and a brake chamber, and for establishing an indirect communication between said source and brake chamber under the control of a brake valve, a second source of fluid pressure, a double check valve communicating with the underside of said diaphragm, with said second source and with said first named source, whereby, upon preponderance of the pressure of said first source with respect to said second source, communication is established between opposite sides of said diaphragm.

13. In a fluid pressure brake system, a chamber having a floating diaphragm, a portion of the upper surface being continuously exposed to a source of fluid pressure and another portion being adapted to close off direct communication between said source and a brake chamber, and for establishing an indirect communication between said source and brake chamber under the control of a brake valve, a second source of fluid pressure, a double check valve communicating with the underside of said diaphragm, with said second source and through an operator-controlled valve to said first named source or to atmosphere, whereby said check valve establishes communication between the underside of said diaphragm and said second source, and whereby, upon opening said operator-controlled valve and upon a reduction of pressure of said second source below that of said first source, communication is established between the underside of said diaphragm and said first named source.

14. In a fluid pressure braking system, a normally closed valvular means operated by differential pressure from two sources of fluid pressure, said means adapted to open automatically upon failure of one of said sources and connect the other of said sources to a brake chamber, and valvular means including a normally closed passage adapted to by-pass said differential pressure means whereby said first named valvular means may return to normally closed position and cut off said other source from said brake chamber.

15. In a fluid pressure braking system, a normally closed valvular means operated by differential pressure from two sources of fluid pressure, said means adapted to open upon failure of one of said sources and connect the other of said sources to a brake chamber, said means also adapted to permit the flow of fluid pressure from the one of said sources to the other upon a preponderance of pressure in the one source, and means adapted to by-pass said differential pressure means whereby said valvular means may return to normally closed position and cut off said other source from said brake chamber.

16. In a fluid pressure braking system, two sources of fluid pressure, a brake chamber, means for controlling the flow of fluid pressure from one of said sources to said brake chamber, differential pressure means responsive to the pressure difference between said sources for directly connecting one of said sources of fluid pressure to said brake chamber upon failure of the other source, and means for temporarily rendering said differential pressure means unresponsive to said pressure difference between said sources to cut off the direct flow of fluid pressure from said one source to said brake chamber.

17. In a fluid pressure braking system, a chamber, a diaphragm therein, a valve seat for the rim thereof, an oppositely-directed valve seat for a central portion of said diaphragm, a connection from said oppositely-directed seat to a brake chamber, resilient means urging the central portion into engagement with said seat, separate sources of fluid pressure connected to opposite sides of said diaphragm, and means for cutting off one of said sources and connecting one side of said diaphragm to the other side.

18. In a fluid pressure braking system, a chamber, a diaphragm therein, a valve seat for the rim thereof, an oppositely-directed valve seat for a central portion of said diaphragm, a connection from said oppositely-directed seat to a brake chamber, resilient means urging the central portion into engagement with said seat, a source of fluid pressure connected to said first named chamber and tending to seat the rim of said diaphragm, and unseat the central portion thereof, a second source of fluid pressure connected to said first named chamber through a double check valve and tending to unseat the rim of said diaphragm and seat the central portion thereof, said double check valve having a connection to the first named source of fluid pressure, said connection having valve means for establishing communication through said connection, or for cutting off communication through said connection and exhausting said double check valve.

19. In a fluid pressure braking system, a chamber, a diaphragm therein, a valve seat for the rim thereof, an oppositely-directed valve seat for a central portion of said diaphragm, a connection from said oppositely-directed seat to a brake chamber, resilient means urging the central portion into engagement with said seat, a source of fluid pressure connected to said first named chamber and tending to seat the rim of said diaphragm, and unseat the central portion thereof, a source of fluid pressure connected to said first named chamber through a double check valve and tending to unseat the rim of said diaphragm and seat the central portion thereof, said double check valve having a connection to the first named source of fluid pressure, said connection having valve means for establishing communication through said connection or for cutting off communication through said connection and exhausting said double check valve, said valve means including a solenoid for operating said valve, and an electric control circuit including a switch for exciting said solenoid.

20. In an automotive vehicle braking system, in combination, service brake-applying means, automatic emergency brake-applying means for effecting a brake application on failure of said first named means, and electrically-operated means under the control of the operator for temporarily releasing an emergency brake application.

ARTHUR R. LEUKHARDT.